United States Patent
Zhu et al.

(10) Patent No.: US 11,147,298 B2
(45) Date of Patent: *Oct. 19, 2021

(54) REFRIGERATOR

(71) Applicant: QINGDAO HAIER JOINT STOCK CO., LTD., Qingdao (CN)

(72) Inventors: Xiaobing Zhu, Qingdao (CN); Bo Jiang, Qingdao (CN); Lei Wang, Qingdao (CN); Haoquan Liu, Qingdao (CN); Ruowu Xin, Qingdao (CN)

(73) Assignee: QINGDAO HAIER JOINT STOCK CO., LTD., Qingdao (CN)

( * ) Notice: Subject to any disclaimer, the term of this patent is extended or adjusted under 35 U.S.C. 154(b) by 224 days.

This patent is subject to a terminal disclaimer.

(21) Appl. No.: 16/466,294

(22) PCT Filed: Nov. 28, 2017

(86) PCT No.: PCT/CN2017/113372
§ 371 (c)(1),
(2) Date: Jun. 3, 2019

(87) PCT Pub. No.: WO2018/099374
PCT Pub. Date: Jun. 7, 2018

(65) Prior Publication Data
US 2020/0064053 A1 Feb. 27, 2020

(30) Foreign Application Priority Data

Dec. 2, 2016 (CN) .......................... 201611110816.5

(51) Int. Cl.
*A23L 3/36* (2006.01)
*A23L 3/3436* (2006.01)

(52) U.S. Cl.
CPC ............. *A23L 3/363* (2013.01); *A23L 3/3436* (2013.01); *F25D 2317/04* (2013.01); *F25D 2317/061* (2013.01)

(58) Field of Classification Search
CPC .... F25D 17/045; F25D 17/065; F25D 23/066; F25D 25/025; F25D 29/00;
(Continued)

(56) References Cited

U.S. PATENT DOCUMENTS

| | | | | |
|---|---|---|---|---|
| 4,961,322 | A * | 10/1990 | Oguma .................. | A23L 3/3418 426/419 |
| 11,015,857 | B2 * | 5/2021 | Liu ........................ | F25D 17/042 |
| 2010/0269525 | A1 * | 10/2010 | Wang ...................... | A23B 7/148 62/179 |

FOREIGN PATENT DOCUMENTS

| CN | 2608114 Y | 3/2004 |
|---|---|---|
| CN | 2697545 Y | 5/2005 |

(Continued)

OTHER PUBLICATIONS

English Translation JPH05227881A (Year: 1992).*
(Continued)

*Primary Examiner* — David J Teitelbaum
(74) *Attorney, Agent, or Firm* — Cheng-Ju Chiang (57) ABSTRACT

A refrigerator comprises a refrigerator body, an air-conditioning membrane assembly and an air pump assembly. The refrigerator body defines a storage space and a compressor chamber therein, a storage container is arranged in the storage space, and a freshness-keeping space is defined inside the storage container. The air-conditioning membrane assembly is configured to allow more oxygen than nitrogen in airflow in a surrounding space of the air-conditioning membrane assembly to pass through the air-conditioning membrane and enter an oxygen-rich gas collection chamber. An inlet end of the air pump is communicated with the oxygen-rich gas collection chamber in a controlled manner via a pipeline and a pipeline switching mechanism, for pumping gas in the oxygen-rich gas collection chamber to the outside of the freshness-keeping space, such that the (Continued)

actual content of oxygen in the freshness-keeping space is in a range of 2% to 19%.

8 Claims, 8 Drawing Sheets

(58) Field of Classification Search
CPC .......... F25D 2317/041; F25D 2700/12; F25D 2317/04; B01D 53/228; C01B 13/0251
See application file for complete search history.

(56) References Cited

FOREIGN PATENT DOCUMENTS

| | | | |
|---|---|---|---|
| CN | 101000191 A | 7/2007 | |
| CN | 201218181 Y | 4/2009 | |
| CN | 201251336 Y | 6/2009 | |
| CN | 101766321 A | 7/2010 | |
| CN | 106705536 A | 5/2017 | |
| CN | 106766565 A | 5/2017 | |
| CN | 206291616 U | 6/2017 | |
| CN | 206362069 U | 7/2017 | |
| JP | 04003875 A * | 1/1992 | |
| JP | H05227881 A * | 2/1992 | |
| JP | H0618152 A * | 7/1992 | |
| JP | H9-287869 A | 11/1997 | |
| JP | 2004360948 A * | 12/2004 | ........... F25D 17/042 |
| JP | 2005-257208 A | 9/2005 | |
| JP | 2005-300004 A | 10/2005 | |
| JP | 2007-15210 A | 1/2007 | |
| JP | 2015072103 A * | 10/2013 | |
| KR | 10-2005-0088742 A | 9/2005 | |

OTHER PUBLICATIONS

English Translation JP2015-72103A (Year: 2013).*
English Translation JPH0618152A (Year: 1992).*
English Translation JPH043875A (Year: 1992).*
English Translation JP2004360948 (Year: 2003).*

* cited by examiner

REFRIGERATOR

CROSS-REFERENCE TO RELATED APPLICATION

This application is a 35 U.S.C. § 371 National Phase conversion of International (PCT) Patent Application No. PCT/CN2017/113372, filed on Nov. 28, 2017, which claims priority to Chinese Patent Application No. 201611110816.5 filed on Dec. 2, 2016 and entitled "Refrigerator", the entire contents of which are incorporated herein by reference. The PCT International Patent Application was filed and published in Chinese.

TECHNICAL FIELD

The present invention relates to the field of article storage, and more particularly, to a refrigerator.

BACKGROUND

With the development of society and the improvement of people's living standards, as well as the ever-increasingly faster pace of people's life, people often put a large number of articles they buy in a variety of refrigerators. However, for leafy vegetables and melons and fruits, the low temperature in a storage space of the refrigerator will not only cause wrinkles and marks on skins of these foods, but also affect their original tastes and nutrition.

In the freshness-keeping technology for refrigerators, oxygen is closely related to the oxidation and respiration of food in the refrigerators. The slower the food breathes, the lower the oxidation of the food and the longer the freshness-keeping time. The reduction in the content of oxygen in air has a significant effect on freshness-keeping of food. At present, in order to reduce the content of oxygen in the refrigerator, vacuum freshness-keeping or an additional deoxidation device is generally used in the prior art to perform low oxygen freshness-keeping. However, the operation of vacuum freshness-keeping is usually cumbersome and inconvenient to use. The deoxidation device usually makes use of electrolyte or the like for deoxidation, and is relatively complicated and does not present an obvious deoxidation effect.

The air-conditioning freshness-keeping technology refers generally to a technique for prolonging the storage life of a food by regulating a gas atmosphere (gas composition ratio or gas pressure) of an enclosed space in which stored articles are located, with the basic principle being as follows: in a certain enclosed space, a gas atmosphere different from normal air components is obtained by various regulation methods to suppress physiological and biochemical processes and microbial activities leading to spoilage of the stored articles (generally, food). In particular, in the present application, the air-conditioning freshness-keeping in question will be specifically directed to an air-conditioning freshness-keeping technology that regulates the proportions of gas components.

It is known to those skilled in the art that normal air components include (in percentage by volume, hereinafter the same): about 78% of nitrogen, about 21% of oxygen, about 0.939% of rare gas (helium, neon, argon, krypton, xenon, radon), 0.031% of carbon dioxide, and 0.03% of other gases and impurities (e.g., ozone, nitric oxide, nitrogen dioxide, and water vapor). In the field of air-conditioning freshness-keeping, a nitrogen-rich and oxygen-poor freshness-keeping gas atmosphere is obtained generally by filling an enclosed space with a nitrogen-rich gas to reduce the oxygen content. Here, it is known to those skilled in the art that the nitrogen-rich gas refers to a gas having a nitrogen content exceeding the content of nitrogen in the normal air, for example, the content of nitrogen in the nitrogen-rich gas may be 95% to 99% or even higher; and the nitrogen-rich and oxygen-poor freshness-keeping gas atmosphere refers to a gas atmosphere in which the nitrogen content exceeds the content of nitrogen in the normal air and the oxygen content is lower than the content of oxygen in the normal air.

However, nitrogen generating equipment traditionally used for air-conditioning freshness-keeping is bulky and costly, resulting in that this technology is basically limited to use in various large-scale professional storehouses (the storage capacity is generally at least 30 tons or more), and is not applicable to families or individual users.

SUMMARY

An objective of the present invention is to provide a simple air-conditioning freshness-keeping refrigerator.

A further objective of the present invention is to improve a storage effect of articles in the refrigerator.

In particular, the present invention provides a refrigerator, comprising a refrigerator body, a door body, an air-conditioning membrane assembly and an air pump assembly, wherein the refrigerator body defines a storage space and a compressor chamber therein, a storage container is arranged in the storage space, and a freshness-keeping space is defined inside the storage container; the door body is arranged on the front surface of the refrigerator body to close the storage space; the air-conditioning membrane assembly is mounted to the storage container, and the surrounding space of the air-conditioning membrane assembly is communicated with the freshness-keeping space, the air-conditioning membrane assembly comprises at least one air-conditioning membrane and an oxygen-rich gas collection chamber, and is configured to allow more oxygen than nitrogen in airflow in the surrounding space of the air-conditioning membrane assembly to pass through the air-conditioning membrane and enter the oxygen-rich gas collection chamber; and the air pump assembly is arranged inside the compressor chamber, the air pump assembly comprises an air pump, wherein an inlet end of the air pump is communicated with the oxygen-rich gas collection chamber in a controlled manner via a pipeline and a pipeline switching mechanism, for pumping gas in the oxygen-rich gas collection chamber to the outside of the freshness-keeping space, such that the actual content of oxygen in the freshness-keeping space is in a range of 2% to 19%.

Optionally, the refrigerator further comprises an oxygen sensor arranged in the freshness-keeping space to monitor the actual content of oxygen in the freshness-keeping space; and the air pump assembly is further configured to drive the pipeline switching mechanism to communicate the pipeline from the inlet end of the air pump to the freshness-keeping space when the actual content of oxygen in the freshness-keeping space is greater than 19%, and control the air pump to operate to pump the gas in the oxygen-rich gas collection chamber to the outside of the freshness-keeping space, such that the content of oxygen in the freshness-keeping space is in the range of 2% to 19%.

Optionally, the air-conditioning membrane assembly is an oxygen-rich membrane assembly, wherein at least one air-conditioning membrane is configured as at least one oxygen-rich membrane.

Optionally, the oxygen-rich membrane assembly further comprises a support frame having a first surface and a second surface parallel to each other, wherein a plurality of airflow passages which extends on the first surface and the second surface respectively and penetrates through the support frame to communicate the first surface and the second surface are formed on the support frame; the plurality of airflow passages jointly forms the oxygen-rich gas collection chamber; and the at least one oxygen-rich membrane is two planar oxygen-rich membranes which are respectively laid on the first surface and the second surface of the support frame.

Optionally, the storage container is a sealed drawer which defines the freshness-keeping space.

Optionally, the refrigerator body comprises a cabinet defining a storage space therein.

Optionally, the sealed drawer comprises a drawer cylinder which has a forward opening, is fixed to the cabinet and defines the freshness-keeping space therein; and a drawer body slidably mounted in the drawer cylinder, so as to be operatively withdrawn from and inserted into the drawer cylinder via the forward opening of the drawer cylinder.

Optionally, a plurality of air pressure balance holes is formed in the drawer cylinder to communicate the storage space to the freshness-keeping space.

Optionally, an accommodating chamber which is communicated with the freshness-keeping space is arranged inside a top wall of the drawer cylinder to accommodate the air-conditioning membrane assembly, and at least one first vent hole and at least one second vent hole spaced apart from the at least one first vent hole are respectively formed in a wall surface between the accommodating chamber in the top wall of the drawer cylinder and the freshness-keeping space, to communicate the accommodating chamber to the freshness-keeping space at different positions respectively; the refrigerator further comprises a fan arranged in the accommodating chamber, to drive gas in the freshness-keeping space to flow through the at least one first vent hole, the accommodating chamber and the at least one second vent hole in sequence and then return to the freshness-keeping space.

Optionally, the air pump assembly further comprises a mounting base plate mounted to the bottom surface of the compressor chamber through a plurality of damping foot pads; and a sealed case mounted to the mounting base plate, the air pump being mounted in the sealed case.

In the refrigerator according to the embodiments of the present invention, the air-conditioning membrane assembly allows more oxygen than nitrogen in the freshness-keeping space to pass through the air-conditioning membrane and enter the oxygen-rich gas collection chamber, and the gas in the oxygen-rich gas collection chamber is pumped out of the freshness-keeping space through the air pump, such that the actual content of oxygen in the freshness-keeping space is in the range of 2% to 19%. This oxygen content range is a suitable interval for air-conditioning freshness-keeping of food, such that the actual content of oxygen in the freshness-keeping space is in the above-mentioned suitable range, which can effectively reduce the aerobic respiration intensity of the food while ensuring the basic respiration function, and avoid the anaerobic respiration of the food. Therefore, the storage effect of the foodtuff is improved, and the shelf life of the food is prolonged.

Further, in the refrigerator according to the embodiments of the present invention, the oxygen sensor is arranged in the freshness-keeping space to monitor the actual content of oxygen in the freshness-keeping space. The oxygen content is used as an air-regulating standard, and a communication state between the air pump and the oxygen-rich gas collection chamber is switched by the pipeline switching mechanism, to ensure that the actual content of oxygen in the freshness-keeping space is in the range of 2% to 19%, thereby ensuring the freshness-keeping effect of the foodtuff. Moreover, the air pump assembly is arranged in the compressor chamber, without occupying other places additionally. Therefore, the volume of the refrigerator will not be additionally increased, and the structure of the refrigerator can be made compact.

The above and other objectives, advantages and features of the present invention will be understood by those skilled in the art more clearly according to the detailed description of the specific embodiments of the present invention below with reference to the accompanied drawings.

BRIEF DESCRIPTION OF THE DRAWINGS

Some specific embodiments of the present invention will be described below in detail in an exemplary rather than restrictive manner with reference to the accompanying drawings. The same reference signs in the accompanying drawings represent the same or similar components or parts. Those skilled in the art shall understand that these drawings may not be necessarily drawn according to the scales. In the drawings.

DETAILED DESCRIPTION

Figure 1:
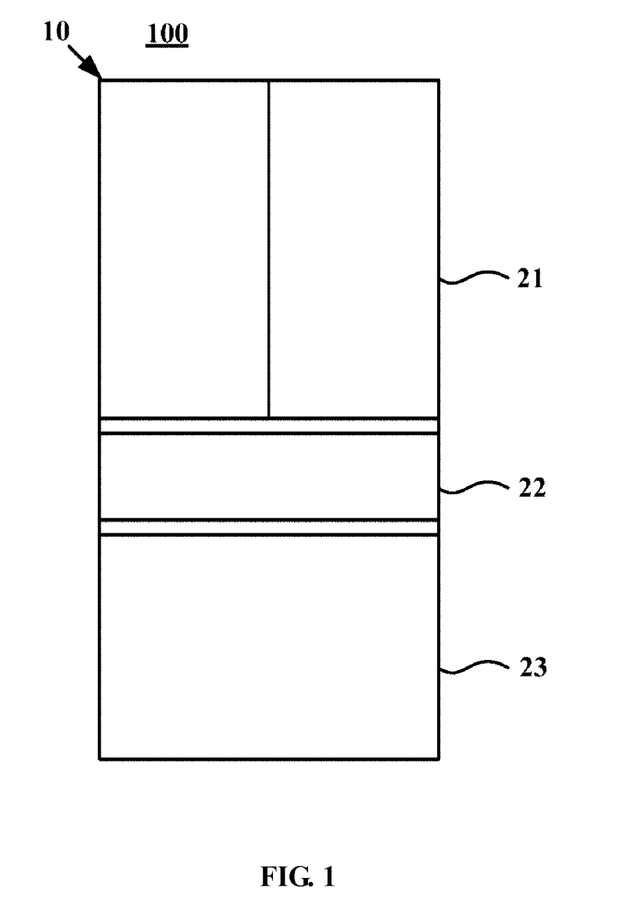
FIG. 1 is a schematic structural diagram of a refrigerator according to an embodiment of the present invention.
Figure 2:
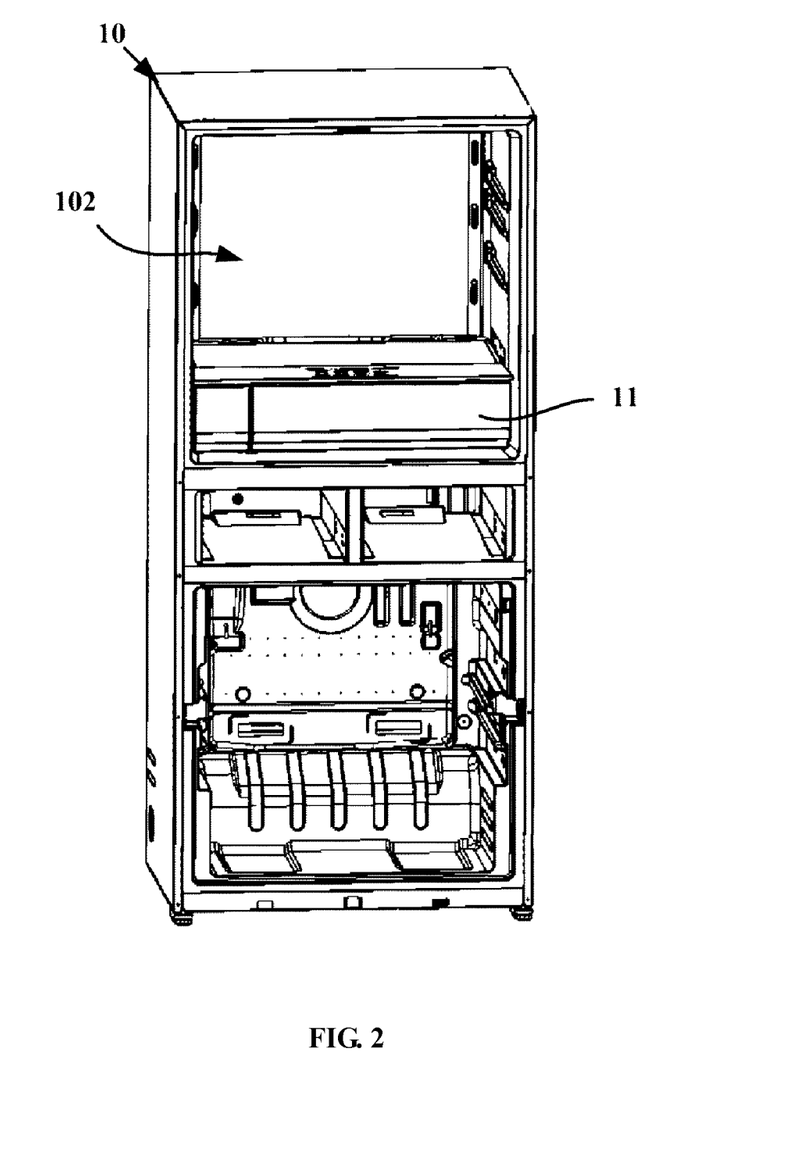
FIG. 2 is a partially schematic structural diagram of the refrigerator according to an embodiment of the present invention.
Figure 3:
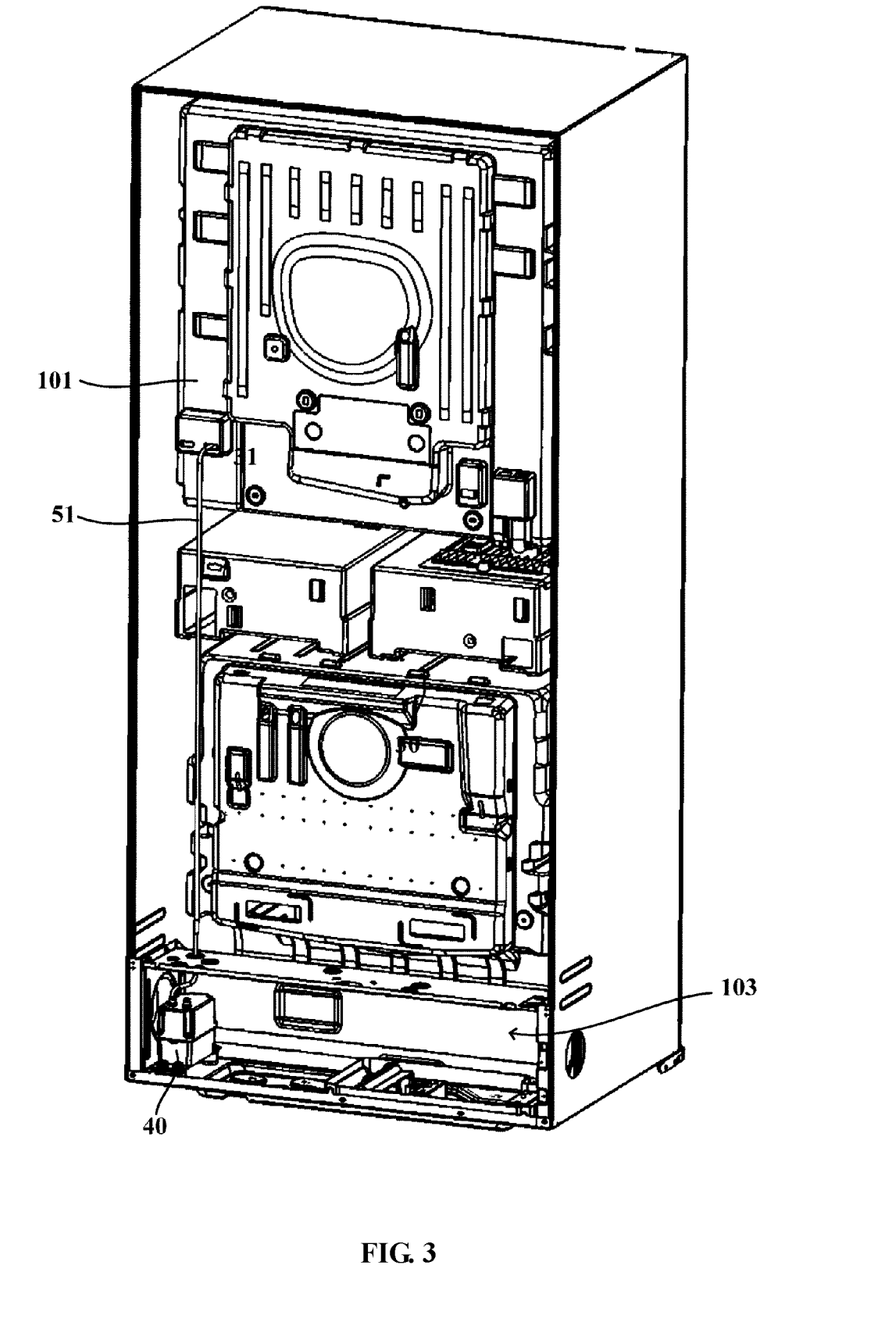
FIG. 3 is a schematic structural diagram of the structure shown in FIG. 2 from another perspective.
Figure 4:
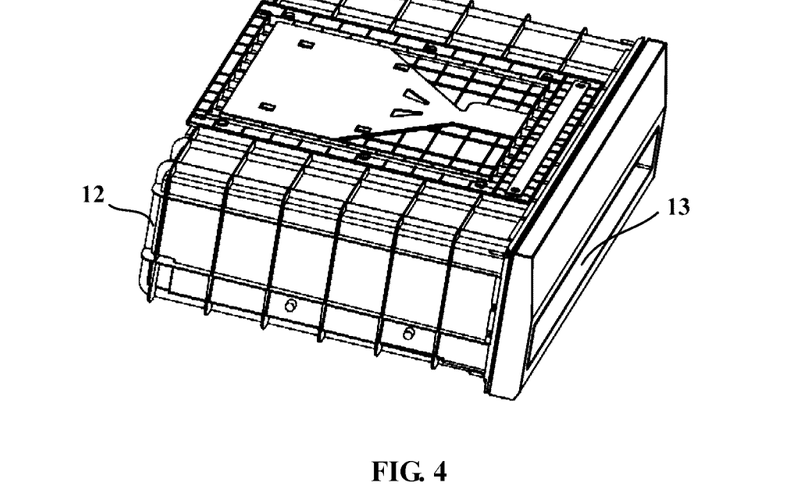
FIG. 4 is a schematic structural diagram of a sealed drawer in the refrigerator according to an embodiment of the present invention.
Figure 5:
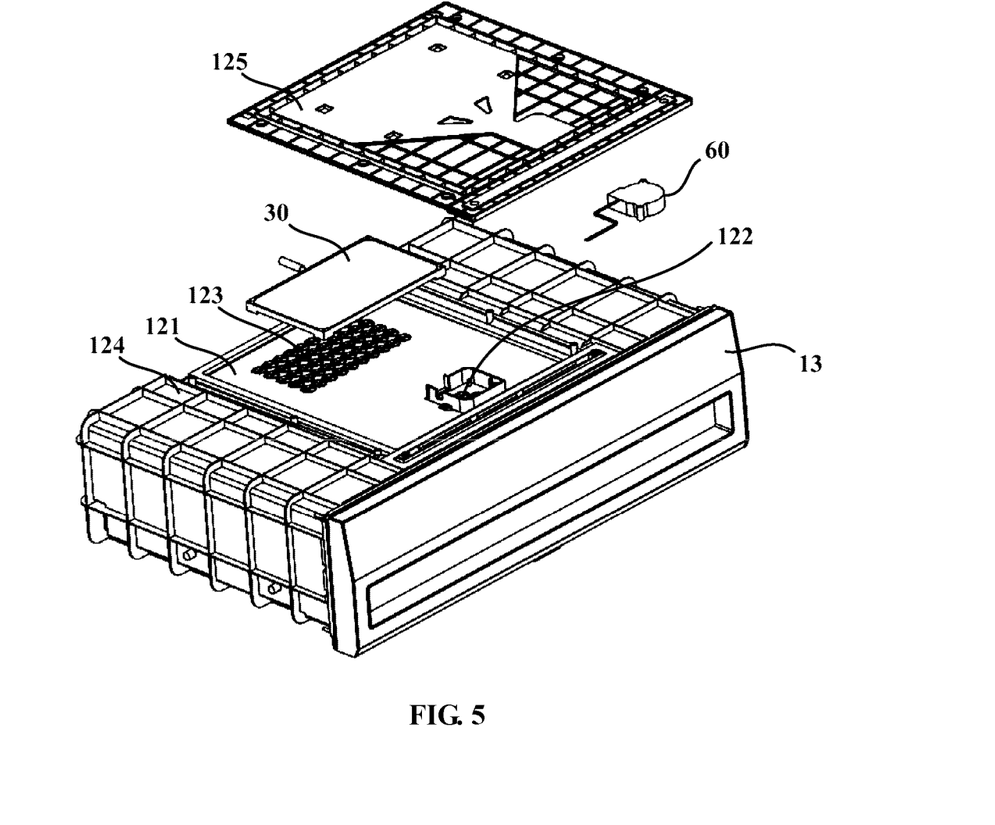
FIG. 5 is a schematic exploded view of the sealed drawer shown in FIG. 4.
Figure 6:
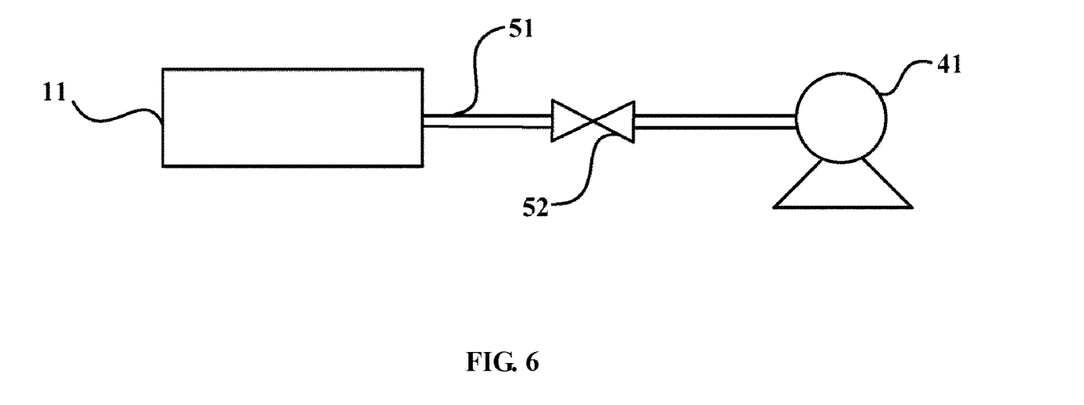
FIG. 6 is a schematic structural diagram in which the sealed drawer is connected with an air pump in the refrigerator according to a further embodiment of the present invention.

This embodiment provides a refrigerator, which can achieve an air-conditioning freshness-keeping function by regulating the content of oxygen in a freshness-keeping space. FIG. 1 is a schematic structural diagram of a refrigerator 100 according to an embodiment of the present invention. FIG. 2 is a partially schematic structural diagram of the refrigerator 100 according to an embodiment of the present invention. FIG. 3 is a schematic structural diagram of the structure shown in FIG. 2 from another perspective. FIG. 4 is a schematic structural diagram of a sealed drawer 11 in the refrigerator 100 according to an embodiment of the present invention. FIG. 5 is a schematic exploded view of the sealed drawer 11 shown in FIG. 4. FIG. 6 is a schematic structural diagram in which the sealed drawer 11 is connected with an air pump 41 in the refrigerator according to a further embodiment of the present invention. As shown in FIG. 1 to FIG. 6, the refrigerator 100 may generally comprise a refrigerator body 10, a door body, an air-conditioning membrane assembly 30 and an air pump assembly 40.

The refrigerator body 10 defines a storage space 102 and a compressor chamber 103 therein. The number and structure of the storage space 102 may be configured as needed. FIG. 1 shows a case where a first space, a second space and a third space are arranged vertically in sequence. The storage spaces may be configured as a refrigerating space, a freezing space, a temperature changing space or a freshness-keeping space according to different purposes. Each storage space may be divided into a plurality of storage areas by partition plates, and articles may be stored using shelves or drawers. A storage container is arranged in the storage space of this embodiment, and defines the freshness-keeping space therein. As shown in FIG. 2, the storage container may be a sealed drawer 11 that defines the freshness-keeping space. In some alternative embodiments, said freshness-keeping space may also be defined by a sealed case, a sealed can, a sealed box, or the like.

The door body is arranged on the front surface of the refrigerator body 10 to close the storage space 102. The door body may correspond to the storage space, that is, each storage space corresponds to one or more door bodies. The number of the storage spaces or door bodies and the functions of the storage spaces may be actually selected according to specific conditions. The refrigerator 100 of this embodiment is provided with a first door body 21, a second door body 22 and a third door body 23 respectively corresponding to the first space, the second space and the third space which are arranged vertically in sequence. The door body may be pivotally arranged on the front surface of the refrigerator body, or may be opened as well in a drawer form to realize a drawer type storage space. The drawer type storage space is often provided with metal slides to ensure gentle opening and closing of the drawer and to reduce the noise. The first space of the refrigerator 100 of this embodiment may be opened in a pivoting manner. The second space and the third space may be opened in a drawer form respectively.

An air-conditioning membrane assembly 30 is provided with at least one air-conditioning membrane and an oxygen-rich gas collection chamber, and configured to allow more oxygen than nitrogen in airflow in the surrounding space of the air-conditioning membrane assembly 30 to pass through the air-conditioning membrane and enter the oxygen-rich gas collection chamber. The air-conditioning membrane assembly 30 is mounted to the storage container, and the surrounding space of the air-conditioning membrane assembly is communicated with the freshness-keeping space. In this embodiment, the air-conditioning membrane assembly 30 may be mounted to the sealed drawer 11.

The air pump assembly 40 is arranged in the compressor chamber 103 and comprises an air pump 41. Since the oxygen-rich gas collection chamber is arranged in the sealed drawer 11, and FIG. 6 shows a schematic diagram in which the air pump 41 is connected with the sealed drawer 11, the air pump 41 is substantially communicated with the oxygen-rich gas collection chamber arranged in the sealed drawer 11. An inlet end of the air pump 41 is communicated with the oxygen-rich gas collection chamber in a controlled manner via a pipeline 51 and a pipeline switching mechanism 52 to pump gas in the oxygen-rich gas collection chamber to the outside of the freshness-keeping space, such that the actual content of oxygen in the freshness-keeping space is in a range of 2% to 19%. Since more oxygen than nitrogen enters the oxygen-rich gas collection chamber through the air-conditioning membrane, a gas in the oxygen-rich gas collection chamber is generally an oxygen-rich gas. The gas is then exhausted out of the freshness-keeping space to reduce the content of oxygen in the freshness-keeping space, such that the oxygen content is caused to be equal to or less than 19%.

The refrigerator 100 further comprises an oxygen sensor arranged in the freshness-keeping space to monitor the actual content of oxygen in the freshness-keeping space. In addition, the air pump assembly 40 is further configured to drive the pipeline switching mechanism 52 to communicate the pipeline from the inlet end of the air pump 41 to the freshness-keeping space when the actual content of oxygen in the freshness-keeping space is greater than 19%, and control the air pump 41 to operate to pump the gas in the oxygen-rich gas collection chamber to the outside of the freshness-keeping space, such that the content of oxygen in the freshness-keeping space is in a range of 2% to 19%. According to different kinds of food, the oxygen content range of 2% to 19% may be refined, such that the gas atmosphere in the freshness-keeping space can meet the freshness-keeping needs of different kinds of food. In some embodiments, if the content of oxygen in the freshness-keeping space is equal to 19% or less than 19%, the pipeline switching mechanism 52 may close the pipeline from the inlet end of the air pump 41 to the freshness-keeping space, and the air pump 41 stops operating as well.

The inventor has found upon a plurality of experiments that the freshness-keeping lives of various foods will be different depending on the difference in the content of oxygen in the freshness-keeping space, in the case of other storage conditions being the same. In addition, the content of oxygen in the freshness-keeping space is in a range of 2% to 19%, which is a generally suitable range for air-conditioning freshness-keeping of all kinds of food. A specific example will be introduced in the following: in the case where normal air contains about 21% of oxygen (the oxygen content is 21%), under certain other storage conditions, the freshness-keeping time of an apple is 12 days; the freshness-keeping time of grapes is 4 days; the freshness-keeping time of a baby cabbage is 13 days; the freshness-keeping time of broccoli is 14 days; the freshness-keeping time of a radish is 20 days; the freshness-keeping time of fresh lentinus edodes is 4 days; the freshness-keeping time of lychee is 7 days; the freshness-keeping time of a kiwifruit is 8 days; the freshness-keeping time of a strawberry is 4 day; and the freshness-keeping time of salmon is 3 days. While after part of oxygen in the freshness-keeping space is exhausted so that the content of oxygen in the freshness-keeping space is 15%, in the case of other storage conditions being the same, the freshness-keeping time of an apple is 50 days; the freshness-keeping time of grapes is 18 days; the freshness-keeping time of a baby cabbage is 36 days; the freshness-keeping time of broccoli is 40 days; the freshness-keeping time of a radish is 90 days; the freshness-keeping time of fresh lentinus edodes is 15 days; the freshness-keeping time of lychee is 27 days; the freshness-keeping time of a kiwifruit is 37 days; the freshness-keeping time of a strawberry is 21 days; and the freshness-keeping time of salmon is 30 days. In the case of the oxygen content of 15%, the freshness-keeping time of each of various foods is far longer than that in the case of the oxygen content of 21%. When the content of oxygen in the freshness-keeping space is in a range of 2% to 19%, it is possible to effectively reduce the aerobic respiration intensity of food in the freshness-keeping space while the basic respiration effect of the food is ensured, and avoid the anaerobic respiration of the food, thereby ensuring the freshness-keeping effect of the food and extend the shelf life of the food. In the meantime, it is possible to assist in improving the freshness-keeping effect of the food by keeping the temperature in the freshness-keeping space within a certain range. Different food may correspond to different suitable storage temperatures. For example, a refrigerating temperature of vegetables is generally 2° C. to 8° C., a refrigerating temperature of cold fresh meat is generally −2° C. to 1° C., and a freezing temperature of various foods is generally −22° C. to −14° C. The freshness-keeping effects of various foods may be improved effectively by enabling the actual content of oxygen in the freshness-keeping space to be in a range of 2% to 19%, and by keeping the temperature in the freshness-keeping space in a suitable storage temperature range for various foods. It should be noted that the specific values of the above freshness-keeping time and storage temperature are merely exemplary, and are not intended to limit the present invention.

The air, as original intake air in the freshness-keeping space, has an oxygen content of about 21%. In this embodiment, an oxygen-rich gas in the oxygen-rich gas collection chamber in the freshness-keeping space is exhausted through the air-conditioning membrane assembly 30 and the air pump 40, such that the content of oxygen in the freshness-keeping space is reduced to 19% or less. In other embodiments, it is also possible to reduce the content of oxygen in the freshness-keeping space to be 19% or less by filling the freshness-keeping space with an inert gas or a gas beneficial to the freshness-keeping of food to reduce the content of oxygen in the freshness-keeping space. The gas beneficial to freshness-keeping of the food may be carbon dioxide which may inhibit the aerobic respiration process of fruits and vegetables, inhibit the processes of degradation of pectin substances and chlorophyll, etc., thereby delaying the maturity of food. The gas maturity to freshness-keeping of the food may also be nitric oxide which may regulate cell apoptosis, affect the metabolism of endogenous ethylene in vegetables and regulate the respiratory intensity of leaf stomata, thereby playing an important role in preventing the decay of food. It should be noted that the use of normal air as the original intake air in this embodiment is not intended to limit the present invention. In some other embodiments, gas components in the freshness-keeping space may be different from those of the normal air, but it is also possible to reduce the actual content of oxygen in the freshness-keeping space by pumping an oxygen-rich gas by the air-conditioning membrane assembly 30 and the air pump 40, and by filling the freshness-keeping space with an inert gas or a gas beneficial to freshness-keeping of food.

As shown in FIG. 3, the refrigerator body 10 may comprise a cabinet 101 defining the freshness-keeping space 102 therein. As shown in FIG. 4, the sealed drawer 11 comprises a drawer cylinder 12 which has a forward opening, is fixed to the cabinet 101 and defines the freshness-keeping space therein; and a drawer body 13 slidably mounted in the drawer cylinder 12, so as to be operatively withdrawn from and inserted into the drawer cylinder via the forward opening of the drawer cylinder 12. The drawer cylinder 12 may be arranged on the lower part of the cabinet. In other embodiments, the drawer cylinder 12 may be arranged on the middle part or the upper part of the cabinet as well. In this embodiment, the cabinet 101 and the drawer cylinder 12 may be formed integrally, or may be formed separately and then mounted together.

A plurality of air pressure balance holes may be formed in the drawer cylinder 12 to communicate the storage space 102 to the freshness-keeping space. Each of the air pressure balance holes may be a hole of a millimeter order. For example, each of the air pressure balance holes may have a diameter of 0.1 mm to 3 mm. It is possible to balance pressures inside and outside the freshness-keeping space by providing a plurality of air pressure balance holes. The arrangement of the plurality of air pressure balance holes may not cause the gas in the freshness-keeping space to flow towards a larger storage space (or flow slightly or even negligibly if any), without affecting the preservation of food in the freshness-keeping space. In other embodiments, the air pressure balance holes may not be formed in the drawer cylinder 12. Even so, there is still a large amount of gas in the freshness-keeping space, e.g., a large amount of nitrogen in the freshness-keeping space. Therefore, a user may open the drawer body 13, without requiring strenuous effort, such that much labor is saved compared to the existing vacuum storage compartment.

The air-conditioning membrane assembly 30 is mounted to the storage container, and the surrounding space of the air-conditioning membrane assembly 30 is communicated with the freshness-keeping space. In this embodiment, the air-conditioning membrane assembly 30 may be mounted to the sealed drawer 11. As shown in FIG. 5, the air-conditioning membrane assembly 30 may be arranged on the drawer cylinder 12, and preferably arranged on the top wall of the drawer cylinder 12. Specifically, an accommodating chamber 12 which is communicated with the freshness-keeping space is arranged inside a top wall of the drawer cylinder 12 to accommodate the air-conditioning membrane assembly 30. At least one first vent hole 122 and at least one second vent hole 123 spaced apart from the at least one first vent hole 122 are respectively formed in a wall surface between the accommodating chamber 121 in the top wall of the drawer cylinder 12 and the freshness-keeping space, to communicate the accommodating chamber 121 to the freshness-keeping space at different positions respectively. The first vent hole 122 and the second vent hole 123 are both small holes, and may be plural in number. In some alternative embodiments, the inside of the top wall of the drawer cylinder 12 has a recessed groove. The air-conditioning membrane assembly 30 is arranged in the recessed groove of the top wall of the drawer cylinder 12.

In some embodiments of the present invention, in order to promote the flow of the gas in the freshness-keeping space and the gas in the accommodating chamber 121, the refrigerator 100 may further include a fan 60 arranged in the accommodating chamber 121, to drive the gas in the freshness-keeping space to flow through the at least one first vent hole 122, the accommodating chamber 121 and the at least one second vent hole 123 in sequence and then return to the freshness-keeping space. The fan 60 is preferably a centrifugal fan arranged at the first vent hole 122 in the accommodating chamber 121. That is, the centrifugal fan is located above the at least one first vent hole 122, and keeps an axis of rotation vertically downward. An air inlet of the centrifugal fan directly faces the first vent hole 122. An air outlet of the centrifugal fan may face the air-conditioning membrane assembly 30. The air-conditioning membrane assembly 30 is arranged above the at least one second vent hole 123, such that each of the air-conditioning membranes of the air-conditioning membrane assembly 30 is parallel to the top wall of the drawer cylinder 12. At least one first vent hole 122 is formed in the front part of the top wall, and at least one second vent hole 123 is formed in the rear part of the top wall. That is, the centrifugal fan is arranged at the front part of the accommodating chamber 121, and the air-conditioning membrane assembly 30 is arranged at the rear part of the accommodating chamber 121.

Further, the top wall of the drawer cylinder 12 comprises a lower plate portion 124 and a cover plate portion 125. A recessed portion is formed in a partial area of the lower plate portion 124. The cover plate portion 125 detachably covers the recessed portion to form the accommodating chamber 121. In order to facilitate the manufacture of the drawer cylinder 12, the lower plate portion 124 may be integrally formed with the side wall, the bottom wall, and the rear wall of the drawer cylinder 12.

Figure 7:
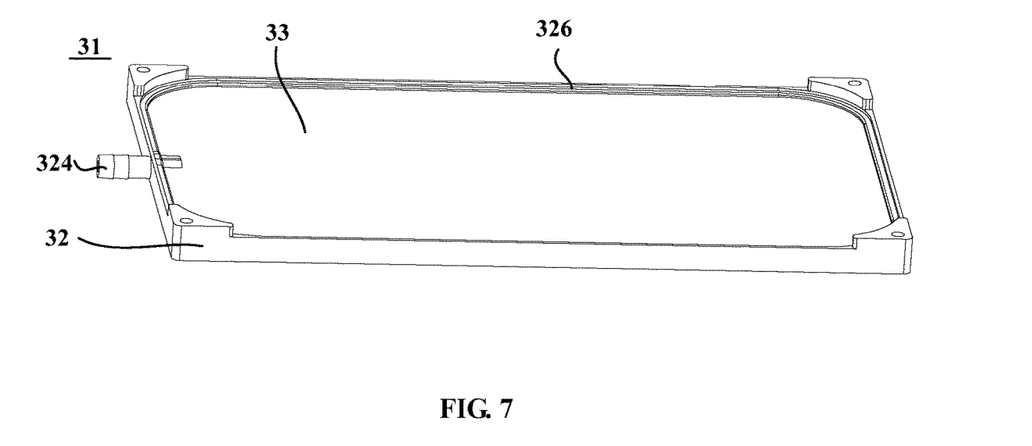
FIG. 7 is a schematic structural diagram of an air-conditioning membrane assembly in the refrigerator according to an embodiment of the present invention.
Figure 8:
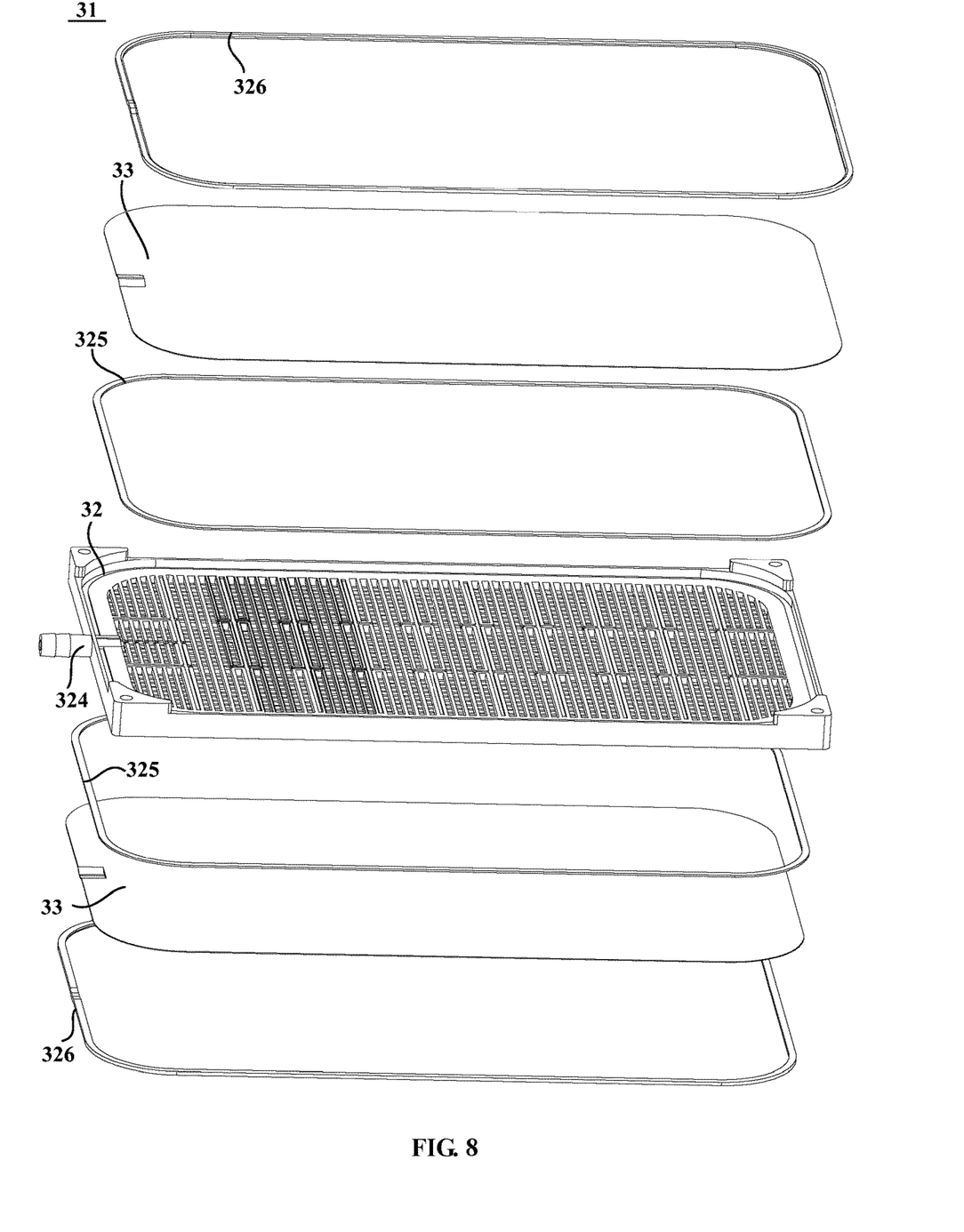
FIG. 8 is a schematic exploded view of the air-conditioning membrane assembly shown in FIG. 7.
Figure 9:
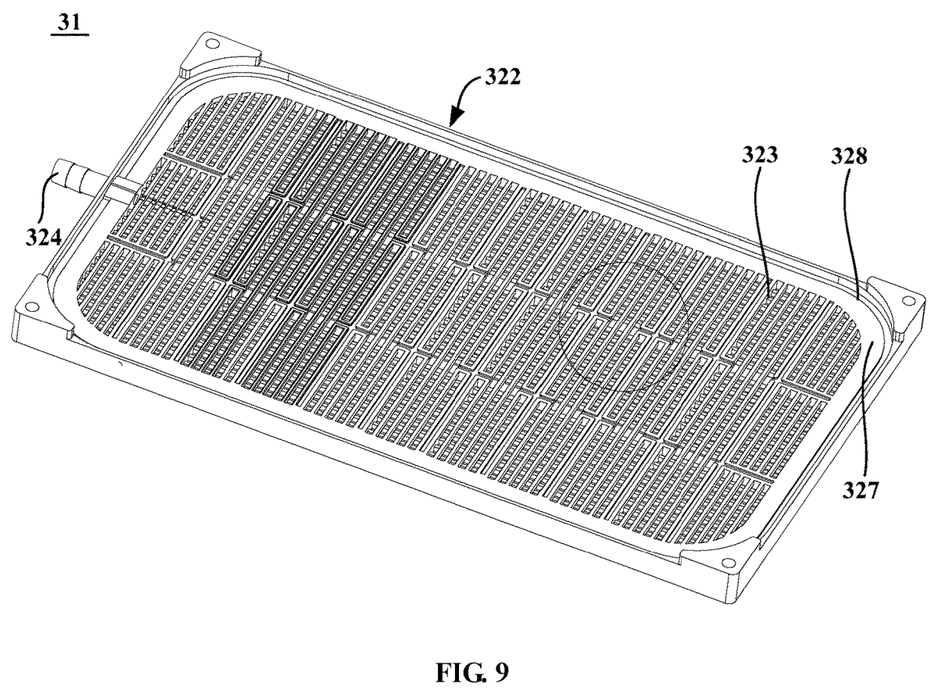
FIG. 9 is a schematic structural diagram of a support frame in the air-conditioning membrane assembly shown in FIG. 8.
Figure 10:
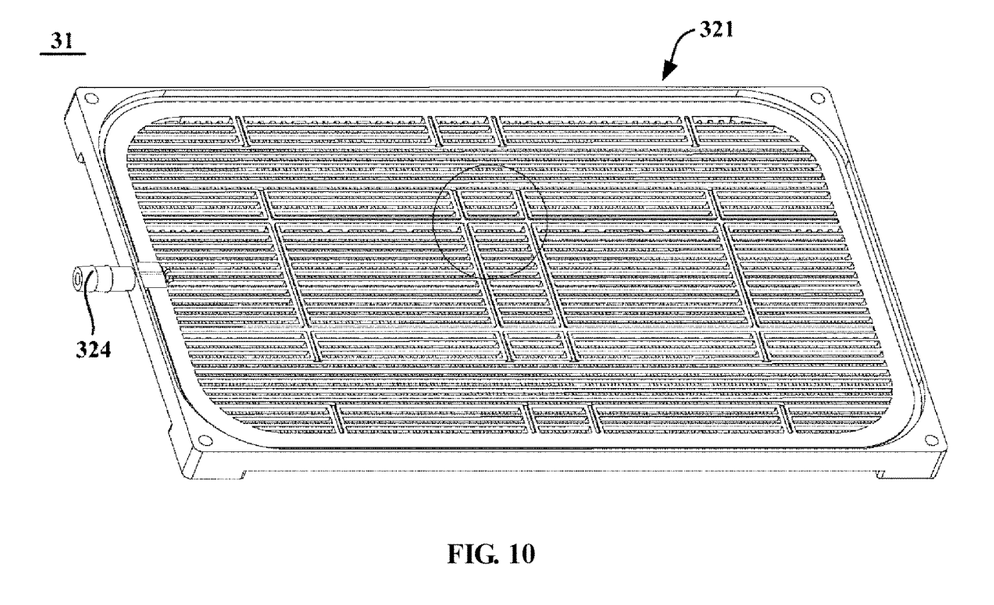
FIG. 10 is a schematic structural diagram of the support frame in the air-conditioning membrane assembly shown in FIG. 8 as observed from another perspective.

FIG. 7 is a schematic structural diagram of the air-conditioning membrane assembly in the refrigerator 100 according to an embodiment of the present invention. FIG. 8 is a schematic exploded view of the air-conditioning membrane assembly shown in FIG. 7. FIG. 9 is a schematic structural diagram of a support frame in the air-conditioning membrane assembly shown in FIG. 8. FIG. 10 is a schematic structural diagram of the support frame in the air-conditioning membrane assembly shown in FIG. 8 as observed from another perspective. In the present embodiment, the air-conditioning membrane is an oxygen-rich membrane, and the air-conditioning membrane assembly 30 may be an oxygen-rich membrane assembly 31. The oxygen-rich membrane assembly 31 of this embodiment may generally comprise a support frame 32 and an oxygen-rich membrane 33 arranged on the support frame 32.

In the embodiment of the present invention, the oxygen-rich membrane 33 is permeable to all gases, except that different gases have different degrees of permeation. Gas permeation through the oxygen-rich membrane 33 is a complex process. The permeation mechanism of this process generally resides in that gas molecules are first adsorbed to the surface of the oxygen-rich membrane 33 and dissolved, then diffused in the oxygen-rich membrane 33, and finally desorbed from the other side of the oxygen-rich membrane 33. The oxygen-rich membrane separation technique realizes gas separation depending on the difference in dissolution and diffusion coefficients of different gases in the oxygen-rich membrane 33. When mixed gas is subjected to a certain driving force (pressure difference or pressure ratio in both sides of the oxygen-rich membrane 33), gases, such as oxygen, hydrogen, helium, hydrogen sulfide, carbon dioxide and the like which have relatively high permeation rates penetrate through the oxygen-rich membrane 33, and are then enriched on the permeation side of the oxygen-rich membrane 33. However, gases, such as nitrogen, carbon monoxide and the like which have relatively low permeation rates are retained on the retention side of the oxygen-rich membrane 33 and are then enriched. Therefore, the purpose of separation of the mixed gas is achieved.

The support frame 32 has a first surface 321 and a second surface 322 parallel to each other. A plurality of airflow passages 323 which extends on the first surface 321 and the second surface 322 respectively and penetrates through the support frame 32 to communicate the first surface 321 to the second surface 322 are formed on the support frame 32. The plurality of airflow passages 323 jointly forms the oxygen-rich gas collection chamber. At least one oxygen-rich membrane 33 may be arranged in the present embodiment. Preferably, two planar oxygen-rich membranes may be arranged, and are laid on the first surface 321 and the second surface 322 of the support frame 32 respectively. When the pressure inside the oxygen-rich membrane 33 is lower than the pressure outside thereof, the oxygen-rich membrane 33 may allow oxygen in air outside thereof to pass through the oxygen-rich membrane 33 into the oxygen-rich gas collection chamber, to form an oxygen-rich gas, such that the air outside the oxygen-rich membrane becomes a nitrogen-rich gas.

In some embodiments, the support frame 32 comprises a suction hole 324 that is communicated with at least one of the plurality of airflow passages 323, to allow the oxygen-rich gas in the oxygen-rich gas collection chamber to be sucked out by the air pump 41. As the oxygen-rich gas in the oxygen-rich gas collection chamber is sucked out, the oxygen-rich gas collection chamber is in a negative pressure state. Therefore, oxygen in air outside the oxygen-rich membrane assembly 31 will continue to pass through the oxygen-rich membrane 33 into the oxygen-rich gas collection chamber, such that the air outside the oxygen-rich membrane assembly 31 forms a nitrogen-rich atmosphere. In some embodiments, the plurality of airflow passages 323 formed inside the support frame 32 may be a plurality of cavities that is communicated with the suction hole 324.

In some embodiments, referring to FIGS. 8 and 9, for further ease of installation, it is possible to pre-fasten the oxygen-rich membrane 33 in a mounting groove 327 of the support frame 32 by using a circle of double-sided adhesive tape 325, and then fill a loop slot 328 of the support frame 32 with a circle of sealing adhesive 326, such that the oxygen-rich membrane 33 is mounted in the mounting groove 327 of the support frame 32 in a sealed manner.

The inlet end of the air pump 41 is communicated with the oxygen-rich gas collection chamber in the freshness-keeping space via the pipeline 51 and the pipeline switching mechanism 52, and concretely, may be communicated with the suction hole 324. The air pump 41 is configured to suck air outwards through the suction hole 324, such that the pressure in the oxygen-rich gas collection chamber is lower than the pressure of the freshness-keeping space. That is to say, as the air pump 41 sucks air outwards, the air in the freshness-keeping space may flow to the oxygen-rich membrane assembly. Under the action of the oxygen-rich membrane assembly, some or all of oxygen in the air in the freshness-keeping space enters the oxygen-rich gas collection chamber and is then exhausted out of the freshness-keeping space through the pipeline 51 and the air pump 41, such that a gas atmosphere which is rich in nitrogen and deficient in oxygen to facilitate the freshness-keeping of food may be obtained in the freshness-keeping space.

The oxygen-rich membrane assembly allows oxygen in air to preferentially pass through the oxygen-rich membrane to obtain oxygen under the driving of a pressure difference by using the difference in permeation rates of various gas components in air that pass through the oxygen-rich membrane. In some other embodiments, the air-conditioning membrane may also be a hollow fiber membrane. The air-conditioning membrane assembly is configured as a hollow fiber membrane assembly. The hollow fiber membrane assembly allows oxygen molecules to preferentially penetrate through the hollow fiber membrane to obtain oxygen since the oxygen molecules are smaller than nitrogen molecules, by using the difference in permeation rates of various gas components in the air that pass through the hollow fiber membrane.

Figure 11:
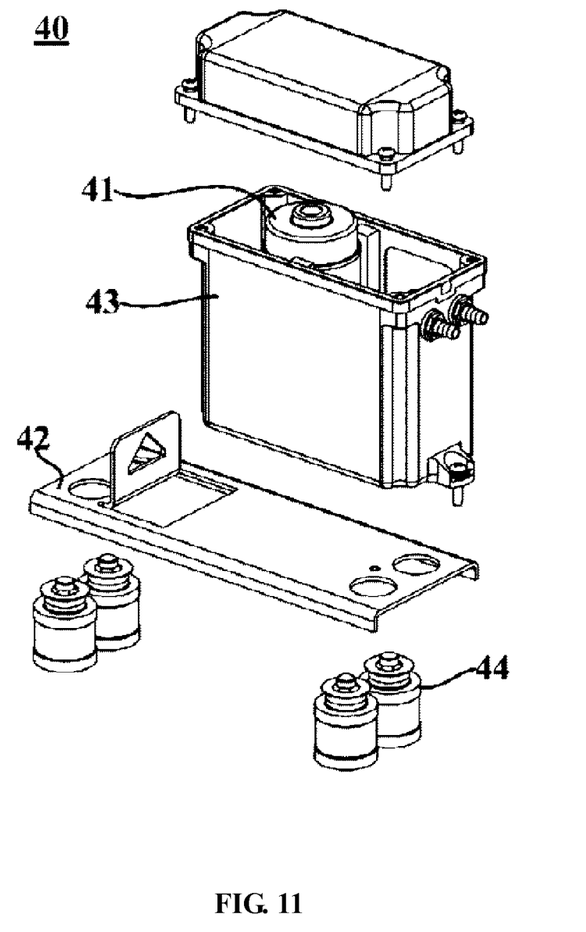
FIG. 11 is a schematic structural diagram of an air pump assembly in the refrigerator according to an embodiment of the present invention.

FIG. 11 is a schematic exploded view of an air pump assembly 40 in the refrigerator 100 according to an embodiment of the present invention. As shown in FIG. 11, in some embodiments of the present invention, the air pump assembly 40 may further comprise a mounting base plate 42 and a sealed case 43. The mounting base plate 42 may be mounted to the bottom surface of the compressor chamber 103 through a plurality of damping foot pads 44. The sealed case 43 is mounted to the mounting base plate 42. The air pump 41 is mounted in the sealed case 43. That is, the air pump 41 may be arranged inside the sealed case 43, and the sealed case 43 may be mounted in the compressor chamber 103 through the mounting base plate 42. When the air pump 41 is in operation, the sealed case 43 may greatly prevent noise and/or waste heat from propagating outwards. Further, in order to improve the damping and noise reduction effects, a plurality of damping foot pads 44 (which may be made of rubber) may also be mounted on the mounting base plate 42. The number of the damping foot pads 44 may be preferably four. The four damping foot pads 44 are mounted in foot pad mounting holes formed in four corners of the mounting base plate 42.

In some embodiments of the present invention, a mounting frame is arranged inside the sealed case 43. The mounting frame is connected to the inner wall of the sealed case 43 by a plurality of damping blocks. The air pump 41 is fixed inside the mounting frame, so as to reduce the vibration and noise when the air pump 41 is in operation. Specifically, the bottom of the mounting frame is provided with two damping blocks which is sleeved on positioning posts on the bottom surface of the sealed case 43. One circular damping block is arranged on each of two opposite sides of the mounting frame, and is clamped in a clamping slot of the corresponding side wall of the sealed case 43. One damping block is fixed to each of the other two opposite sides of the mounting frame. The air pump 41 may be located between the respective damping blocks in the sealed case 43 and fastened to the mounting frame by screws.

A refrigeration system of the refrigerator 100 may be a refrigeration cycle system composed of a compressor, a condenser, a throttle device, an evaporator, and the like. The compressor is mounted in the compressor chamber 103. The evaporator is configured to supply a cooling capacity directly or indirectly into the storage space 102. For example, when the refrigerator is a household compression type directly-cooled refrigerator, the evaporator may be arranged on the outside or inside of the rear wall surface of the cabinet. When the refrigerator is a household compression type air-cooled refrigerator, the refrigerator 10 further has an evaporator chamber inside. The evaporator chamber is communicated with the storage space 102 through an air passage system. In addition, an evaporator is arranged inside the evaporator chamber. A fan is arranged at an outlet of the evaporator chamber to perform circulation cooling for the storage space 102.

In some embodiments of the present invention, the air pump 41 is arranged at one end of the compressor chamber 103, and the compressor may be arranged at the other end of the compressor chamber 103, such that the air pump 41 is away from the compressor, thereby reducing nose superposition and waste heat superposition. For example, the air pump 41 may be arranged at one end, adjacent to the pivoting side of the door body, of the compressor chamber 103. When the refrigerator is a side-by-side refrigerator, the air pump 41 may be arranged at either end of the compressor chamber 103. In still other embodiments of the present invention, the air pump 41 is arranged adjacent to the compressor. The air pump 41 is arranged at one end of the compressor chamber 103, and located between the compressor and the side wall of the compressor chamber 103. The air pump 41 is arranged in the compressor chamber 103, and can fully make use of the space in the compressor chamber, without occupying other places additionally, such that the volume of the refrigerator may not be additionally increased, and the structure of the refrigerator can be made compact.

In the refrigerator 100 according to this embodiment, the air-conditioning membrane assembly allows more oxygen than the nitrogen in the freshness-keeping space to pass through the air-conditioning membrane to enter the oxygen-rich gas collection chamber, and the gas in the oxygen-rich gas collection chamber is pumped to the outside of the freshness-keeping space through the air pump 41, such that the actual content of oxygen in the freshness-keeping space is in a range of 2% to 19%. This oxygen content range is a suitable interval for air-conditioning freshness-keeping of foodtuff, such that the content of oxygen in the freshness-keeping space is in the above-mentioned suitable range, which can effectively reduce the aerobic respiration intensity of the food while ensuring the basic respiration function, and avoid the anaerobic respiration of the food. Therefore, the storage effect of the foodtuff is improved, and the shelf life of the food is prolonged.

Further, in the refrigerator 100 according to this embodiment, the oxygen sensor is arranged in the freshness-keeping space to monitor the actual content of oxygen in the freshness-keeping space. The oxygen content is used as an air-regulating standard, and a communication state between the air pump 41 and the oxygen-rich gas collection chamber is switched by the pipeline switching mechanism, to ensure that the actual content of oxygen in the freshness-keeping space is in a range of 2% to 19%, thereby ensuring the freshness-keeping effect of the food. Moreover, the air pump assembly 40 is arranged in the compressor chamber 103, without occupying other places. Therefore, the volume of the refrigerator will not be additionally increased, and the structure of the refrigerator can be made compact.

Thus, those skilled in the art should recognize that although multiple exemplary embodiments of the present invention have been illustrated and described in detail, many other variations or modifications according with the principle of the present invention may also be determined directly or derived based on the content disclosed by the present invention, without departing from the spirit and scope of the present invention. Thus, the scope of the present invention should be understood and deemed to include these and other variations or modifications.

What is claimed is:
1. A refrigerator, comprising:
a refrigerator body, a door body, an air-conditioning membrane assembly and an air pump assembly, wherein the refrigerator body defines a storage space and a compressor chamber therein, a storage container is arranged in the storage space, and a freshness-keeping space is defined inside the storage container;
the door body is arranged on the front surface of the refrigerator body to close the storage space;
the air-conditioning membrane assembly is mounted to the storage container, and the surrounding space of the air-conditioning membrane assembly is communicated with the freshness-keeping space, the air-conditioning membrane assembly comprises at least one air-conditioning membrane and an oxygen-rich gas collection chamber, and is configured to allow more oxygen than nitrogen in airflow in a surrounding space of the air-conditioning membrane assembly to pass through the air-conditioning membrane and enter the oxygen-rich gas collection chamber;

the air pump assembly is arranged inside the compressor chamber, and the air pump assembly comprises an air pump, wherein an inlet end of the air pump is communicated with the oxygen-rich gas collection chamber in a controlled manner via a pipeline and a pipeline switching mechanism, for pumping gas in the oxygen-rich gas collection chamber to the outside of the freshness-keeping space, such that the actual content of oxygen in the freshness-keeping space is in a range of 2% to 19%; and the air-conditioning membrane assembly is an oxygen-rich membrane assembly, wherein at least one air-conditioning membrane is configured as at least one oxygen-rich membrane;

wherein the oxygen-rich membrane assembly further comprises:

a support frame having a first surface and a second surface parallel to each other, wherein a plurality of airflow passages which extends on the first surface and the second surface respectively and penetrates through the support frame to communicate the first surface and the second surface are formed on the support frame; the plurality of airflow passages jointly forms the oxygen-rich gas collection chamber, and the at least one oxygen-rich membrane is two planar oxygen-rich membranes which are respectively laid on the first surface and the second surface of the support frame.

2. The refrigerator according to claim 1, further comprising:

an oxygen sensor arranged in the freshness-keeping space to monitor the actual content of oxygen in the freshness-keeping space, and the air pump assembly is further configured to drive the pipeline switching mechanism to communicate the pipeline from the inlet end of the air pump to the freshness-keeping space when the actual content of oxygen in the freshness-keeping space is greater than 19%, and control the air pump to operate to pump the gas in the oxygen-rich gas collection chamber to the outside of the freshness-keeping space, such that the content of oxygen in the freshness-keeping space is in the range of 2% to 19%.

3. The refrigerator according to claim 1, wherein:

the storage container is a sealed drawer which defines the freshness-keeping space.

4. The refrigerator according to claim 3, wherein the refrigerator body comprises:

a cabinet defining the storage space therein.

5. The refrigerator according to claim 4, wherein the sealed drawer comprises:

a drawer holder which has a forward opening, is fixed to the cabinet and defines the freshness-keeping space therein; and a drawer body slidably mounted in the drawer holder, so as to be operatively withdrawn and inserted from and into the drawer holder via the forward opening of the drawer holder.

6. The refrigerator according to claim 5, wherein:

a plurality of air pressure balance holes is formed in the drawer holder to communicate the storage space to the freshness-keeping space.

7. The refrigerator according to claim 5, wherein:

an accommodating chamber which is communicated with the freshness-keeping space is arranged inside a top wall of the drawer holder to accommodate the air-conditioning membrane assembly, and at least one first vent hole and at least one second vent hole spaced apart from the at least one first vent hole are respectively formed in a wall surface between the accommodating chamber in the top wall of the drawer holder and the freshness-keeping space, to communicate the accommodating chamber to the freshness-keeping space at different positions respectively;

the refrigerator further comprises a fan arranged in the accommodating chamber, to drive the gas in the freshness-keeping space to flow through the at least one first vent hole, the accommodating chamber and the at least one second vent hole in sequence and then return to the freshness-keeping space.

8. A refrigerator, comprising:

a refrigerator body, a door body, an air-conditioning membrane assembly and an air pump assembly, wherein the refrigerator body defines a storage space and a compressor chamber therein, a storage container is arranged in the storage space, and a freshness-keeping space is defined inside the storage container;

the door body is arranged on the front surface of the refrigerator body to close the storage space;

the air-conditioning membrane assembly is mounted to the storage container, and the surrounding space of the air-conditioning membrane assembly is communicated with the freshness-keeping space, the air-conditioning membrane assembly comprises at least one air-conditioning membrane and an oxygen-rich gas collection chamber, and is configured to allow more oxygen than nitrogen in airflow in a surrounding space of the air-conditioning membrane assembly to pass through the air-conditioning membrane and enter the oxygen-rich gas collection chamber;

the air pump assembly is arranged inside the compressor chamber, and the air pump assembly comprises an air pump, wherein an inlet end of the air pump is communicated with the oxygen-rich gas collection chamber in a controlled manner via a pipeline and a pipeline switching mechanism, for pumping gas in the oxygen-rich gas collection chamber to the outside of the freshness-keeping space, such that the actual content of oxygen in the freshness-keeping space is in a range of 2% to 19%;

wherein the air pump assembly further comprises:

a mounting base plate mounted to the bottom surface of the compressor chamber through a plurality of damping foot pads; and a sealed case mounted to the mounting base plate, the air pump being mounted in the sealed case.

* * * * *